United States Patent [19]

Sluzky et al.

[11] Patent Number: 5,162,930
[45] Date of Patent: Nov. 10, 1992

[54] LIQUID-CRYSTAL LIGHT VALVE IN COMBINATION WITH A CATHODE RAY TUBE CONTAINING A FAR-RED EMITTING PHOSPHOR

[75] Inventors: Esther Sluzky, Encinitas; Mary A. Lemoine, Oceanside; Kenneth R. Hesse, Escondido, all of Calif.

[73] Assignee: Hughes Aircraft Company, Los Angeles, Calif.

[21] Appl. No.: 817,183

[22] Filed: Jan. 6, 1992

Related U.S. Application Data

[62] Division of Ser. No. 708,591, May 31, 1991, abandoned.

[51] Int. Cl.⁵ .................. G02F 1/1335; G02F 1/135; C09K 11/64
[52] U.S. Cl. .............. 359/50; 252/301.4 R; 313/467; 340/794; 340/795; 359/72
[58] Field of Search .......... 252/301.4 R; 359/50, 359/72; 340/794, 795; 313/467

[56] References Cited

U.S. PATENT DOCUMENTS

| | | | |
|---|---|---|---|
| 3,857,054 | 12/1974 | Lehmann et al. | 252/301.4 R |
| 4,350,604 | 9/1982 | Awazu et al. | 252/301.4 R |
| 4,799,050 | 1/1989 | Prince et al. | 359/50 |
| 4,925,276 | 5/1990 | McMurray et al. | 359/72 |
| 5,009,490 | 4/1991 | Kovuo et al. | 359/72 |
| 5,084,777 | 1/1992 | Slobodin | 359/72 |

FOREIGN PATENT DOCUMENTS 1-215885  8/1989  Japan .................. 252/301.4 R

OTHER PUBLICATIONS

Jones "J. of Electrochem. Soc.", vol. 95, No. 6, Jun. 1948 pp. 295-298.

*Primary Examiner*—Jack Cooper
*Attorney, Agent, or Firm*—Jeannette M. Walder; Terje Gudmestad; Wanda K. Denson-Low

[57] ABSTRACT

A far-red emitting phosphor for cathode ray tubes used in liquid crystal light valves comprises lithium aluminum (or gallium) oxide, activated with iron or chromium. Increasing the activator concentration from 0.005 mole (commercially available) to about 0.015 to 0.05 mole increases the phosphor efficiency by about 50% and reduces the decay time from 30 msec (for the commerically available material) to 19 msec. Reducing the particle size to an average of 4 μm or less provides the requisite high resolution for the CRT application.

5 Claims, 1 Drawing Sheet

LIQUID-CRYSTAL LIGHT VALVE IN COMBINATION WITH A CATHODE RAY TUBE CONTAINING A FAR-RED EMITTING PHOSPHOR

This is a division of application Ser. No. 708,591, filed May 31, 1992, now abandoned.

BACKGROUND OF THE INVENTION

1. Field of the Invention

The present invention relates to phosphors used in cathode ray tubes (CRTs) for liquid crystal displays, and, more particularly, to phosphors of lithium aluminum oxide activated with iron.

2. Description of Related Art

An existing far-red phosphor used in luminescent lamp manufacturing consists of a lithium aluminum oxide activated with iron ($LiAlO_2$:Fe). By "far-red" is meant that region of the electromagnetic spectrum between about 600 to 800 nm. In commercially available material, the iron concentration is about 0.005 mole; this material has been optimized for fluorescent lamps where near-IR output is useful for enhancing plant growth. This phosphor, when used in cathode ray tubes (CRTs), has a much longer decay time than can be tolerated for use in liquid crystal light valves employing α-silicon as the photosensitive material. In addition, the light output at reasonable drive levels is insufficient to operate the light valve. When greater drive levels are used, increasing the light output, the spot size becomes too large, resulting in resolution outside specification.

No other commercially available phosphor satisfies the requirements for liquid crystal light valve (LCLV) CRTs in terms of spectral energy distribution, decay time, efficiency, and particle size. While $LiAlO_2$:Fe meets the spectral range, the decay time (30 msec) and particle size ($>16$ μm) of the commercially available material limits its use in liquid crystal light valve applications.

Other phosphors have been investigated in an attempt to find a phosphor having the correct characteristics in regard to spectral emission, decay time, efficiency, and small particle size. Such other phosphors include aluminum oxide:Cr, cadmium sulfide:Ag, zinc cadmium sulfide:Ag, zinc phosphate:Mn, yttrium oxysulfide:Eu, yttrium aluminum oxide:Eu, among others. None have been found to have the exact attributes of the $LiAlO_2$:Fe material; the commercially available material is made specifically for luminescent lamps and is not suitable for CRT applications because of its long decay time.

A need remains for a suitable phosphor for LCLV CRTs.

SUMMARY OF THE INVENTION

In accordance with the invention, $LiAlO_2$ and $LiGaO_2$ doped with Fe are phosphors which exhibit faster decay and increased light output under cathode ray excitation, compared with commercially available far-red phosphors. The decay time of this material has been determined by the inventors to be dependent upon activator concentrations. A 50% improvement of the phosphor efficiency and reduced decay time of 19 msec is achieved when the iron concentration is increased to at least about 0.015 mole. Reducing the particle size to an average of about 4 μm provides a desired high resolution.

DESCRIPTION OF THE PREFERRED EMBODIMENTS

Figure 1:
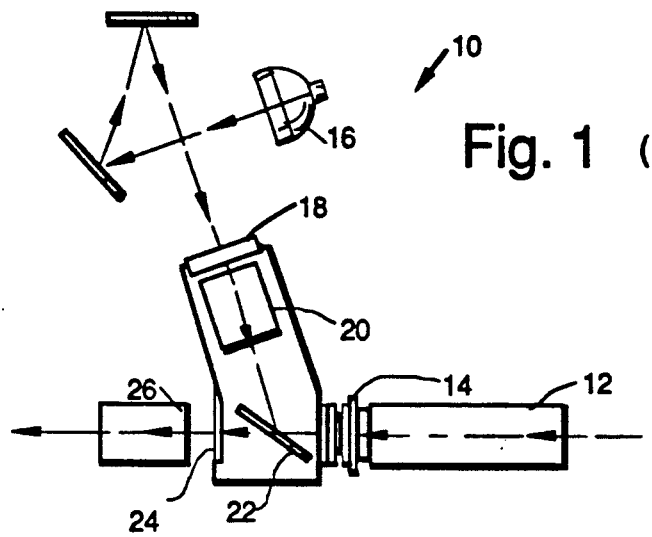
FIG. 1 is a schematic diagram of a liquid crystal light valve projector system, employing a cathode ray tube.

A liquid crystal light valve (LCLV) is described in, for example, SID International Symposium, Digest of Technical Papers, "Video-Rate Liquid Crystal Light-Valve Using an Amorphous Silicon Photoconductor", R. D. Sterling et al, Vol. XXI, pp. 327–328 (1990). FIG. 1, which is taken from that reference, is a schematic diagram of a basic LCLV projector comprising a cathode ray tube (CRT) 12, which provides an input image which is coupled to a liquid crystal light valve 14, typically through a fused fiber optic faceplate (not shown). A xenon arc lamp 16 provides the output light, which is filtered by UV filter 18 and linearly polarized by pre-polarizer filter 20 before reaching the LCLV 14. The image then passes through a polarizing mirror 22, a prism wedged window 24, and then through a projection lens 26, where it is projected onto a screen (not shown).

The foregoing projector is an example of apparatus employing a combination of the LCLV and CRT. Other combinations of LCLVs and CRTs are also known. While such combinations are known to those skilled in the art, none of the CRTs disclosed uses as a phosphor the phosphor of the invention.

Figure 2:
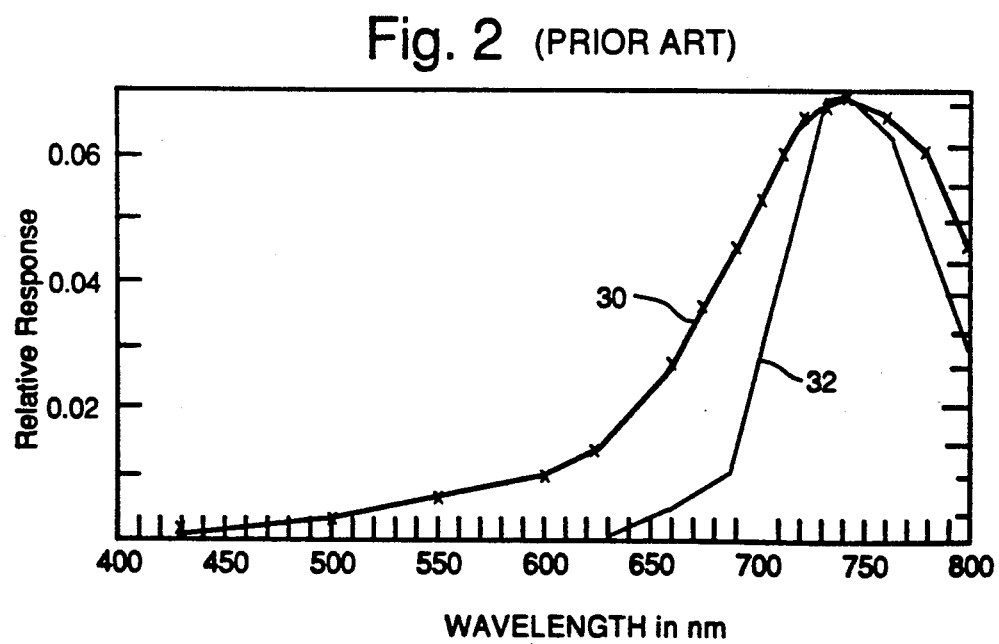
FIG. 2, on coordinates of normalized radiance and wavelength in nanometers, is a plot of the spectral response of an amorphous silicon (α-Si) photoconductor and of a phosphor of the invention.

The LCLV employs a hydrogenated amorphous silicon photoconductor (α-Si:H), as is well-known and as is shown in the afore-mentioned reference. The spectral response of α-Si photoconductor is depicted in FIG. 2 (Curve 30). It is this curve to which a phosphor must be as closely matched as possible for efficient energy coupling.

The minimum iron concentration of the $LiAlO_2$ phosphor of the invention is at least about 0.015 mole. This concentration provides a phosphor efficiency of about 50% more than that of the commercially available material.

With higher concentration of iron in the material, the emission energy increases and the decay becomes shorter. The upper limit of suitable iron concentration appears to be about 0.05 mole.

The preferred iron concentration ranges from about 0.015 to 0.035 mole; the most preferred iron concentration is about 0.025 mole. Outside the preferred range, the light output decreases.

Table I below shows how the emitted energy increases with iron concentration. Table I also shows how the decay time decreases with increasing iron concentration.

TABLE I

Effect of Iron Concentration on Emitted Energy and Decay Time.

| Iron Content | Emitted Energy | Decay Time |
|---|---|---|
| 0.005 mole | 43 | 30.35 ms |
| 0.010 mole | 49 | |
| 0.020 mole | 76 | 23.80 ms |
| 0.025 mole | 78 | |

TABLE I-continued

Effect of Iron Concentration on Emitted Energy and Decay Time.

| Iron Content | Emitted Energy | Decay Time |
| --- | --- | --- |
| 0.050 mole | 63 | 19.18 ms |

The main advantage of the phosphor of the invention is its very close match between the spectral emission curve (Curve 32) and the response curve of the amorphous silicon (Curve 30). As can be seen from FIG. 2, all of the emission energy produced by this material is usable insofar as silicon sensitivity is concerned.

These improvements in the basic phosphor material permit its efficient use in graphics-type displays where high brightness and medium persistence are required.

The high resolution of the phosphor of the invention is measured by the use of a scanning slit photometer. A line is presented on the face of the cathode ray tube and a slit in front of a photocell is scanned across that line. A curve of the cell output plotted as a function of the distance across the line shows the contour of the line brightness. The shape approximates a Gaussian distribution. Resolution is expressed as the width of that distribution at the half amplitude level (FWHA—full wave half amplitude).

CRTs made with the commercially available material exhibited spot sizes of approximately 2.5 mils, compared to 1.3 mils for the phosphor of the invention. As defined herein, "high resolution" means a spot size of less than about 1.5 mils.

Lithium gallium oxide:Fe phosphor has also been found to perform very similarly to the lithium aluminum oxide:Fe phosphor. This material has also been made and is a substitute for the lithium aluminum oxide:Fe. In this case, the amount of iron ranges from about 0.03 to 0.07 mole, and preferably is about 0.05 mole.

The manufacture of lithium aluminum oxide follows the conventional procedure used in the industry. The starting materials may consist of purchased unactivated lithium aluminum oxide and iron oxide. These are mixed by ball milling to produce a mixture as homogeneous as possible. After drying, the material is fired at 1,100° C. for two hours in an oxidizing atmosphere (for $LiAlO_2$). For the preparation of $LiGaO_2$, the firing temperature is reduced to about 1,000° C.

Alternately, the starting materials can consist of stoichiometric quantities of lithium carbonate, aluminum oxide, and iron oxide. After ball milling as above, the mixture is fired under the same conditions Both of these procedures are well-known in the art and thus form no part of this invention.

A typical method of producing a phosphor according to the teachings of the present invention is now described. This method itself is not considered novel, and forms no part of this invention.

Assuming that it is desired to produce 10 g of phosphor starting with oxide components, the required amount (see the formulations below) of oxides are placed into a two-ounce ball mill with about 30 g of sintered alumina balls having a diameter of approximately 9 mm. Fifteen ml of deionized water is added and the mill is closed and placed on the rollers. Producing greater amounts of the phosphor would require appropriate scale-up, as is wellknown.

After rolling for two hours, during which time the oxides are intimately mixed and their sizes somewhat reduced, the mill is removed from the rolls and the contents dumped into a clean receptacle. Rinse water from the mill is added to the main dump charge. After drying in an oven at approximately 110° C., the powder is sieved through 70 stainless steel mesh. This is placed into a sintered alumina boat and loaded into the furnace at 400° C. The temperature is raised to 1,100° C. and held there for two hours. At the end of this time, the temperature is lowered to 400° C., at which time the boat is removed from the furnace. The furnace atmosphere conveniently is air during the firing operations. This final material is crushed in a mortar with a pestle, sieved again, measured for particle size, and is ready for use.

The following shows the starting material weights for the preferred composition:

| Starting with $LiAlO_2$, containing 0.025 mole Fe: | |
| --- | --- |
| $LiAlO_2$ | 10.0 g |
| $Fe_2O_3$ | 0.279 g. |
| Starting with $Li_2CO_3$ and $Al_2O_3$, containing 0.025 mole Fe: | |
| $Li_2CO_3$ | 3.69 g |
| $Al_2O_3$ | 5.1 g |
| $Fe_2O_3$ | 0.184 g. |
| Starting with $Li_2CO_3$ and $Ga_2O_3$, containing 0.05 mole Fe: | |
| $Li_2CO_3$ | 3.69 g |
| $Ga_2O_3$ | 9.40 g |
| $Fe_2O_3$ | 0.54 g. |

Thus, there has been disclosed a far-red emitting phosphor, consisting essentially of $LiAlO_2$:Fe or $LiGaO_2$:Fe. Various changes and modifications of an obvious nature will be readily apparent to those of ordinary skill in this art, and all such changes and modifications are considered to fall within the ambit of the invention, as defined by the appended claims.

What is claimed is:

1. In combination, a liquid crystal light valve including a photosensitive layer consisting essentially of a hydrogenated α-silicon photoconductor and a cathode ray tube containing a far-red emitting phosphor operatively coupled thereto, characterized in that said phosphor consists essentially of a compound selected from the group consisting of (a) $LiAlO_2$ doped with about 0.015 to 0.05 mole of iron and (b) $LiGaO_2$ doped with about 0.03 to 0.07 mole of iron.

2. The combination of claim 1 wherein said phosphor consists essentially of $LiAlO_2$ doped with about 0.015 to 0.035 mole of iron.

3. The combination of claim 2 wherein the amount of iron is about 0.025 mole.

4. The combination of claim 1 wherein said phosphor consists essentially of $LiGalO_2$ doped with about 0.05 mole of iron.

5. The combination of claim 1 wherein said phosphor has a maximum average particle sizes of about 4 μm.

* * * * *